3,738,985
CERTAIN 3-(3-AMINO-2-BENZOYLOXYPROPYL)-
4(3H)-QUINAZOLINONES
Rudi Beyerle, 15 Allensteinerstrasse, 6451 Bruchkobel,
Germany; and Adolf Stachel, deceased; by Ingeburg
Lydia Katharina Stachel, heiress-at-law, 52 Meerholzer-
strasse, 6; Rolf-Eberhard Nitz, 28 Steinauerstrasse, 6;
and Josef Scholtholt, 18 Hunfelderstrasse, 6, all of
Frankfurt am Main-Fechenheim, Germany
No Drawing. Filed Apr. 22, 1971, Ser. No. 136,560
Claims priority, application Germany, Apr. 25, 1970,
P 20 20 233.9
Int. Cl. C07d 51/48
U.S. Cl. 260—243 B                    5 Claims

ABSTRACT OF THE DISCLOSURE

The present invention relates to pharmaceutically active basically substituted 4(3H)-quinazolinone derivatives possessing excellent coronary dilator properties and having the structural formula

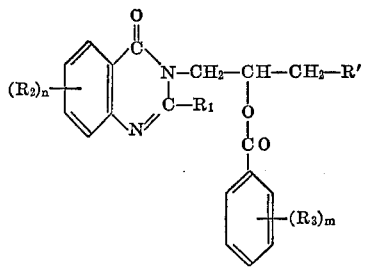

wherein R' stands for a radical selected from the group consisting of secondary aliphatic, cycloaliphatic or araliphatic amines having 2–10 carbon atoms and 5-, 6- or 7-membered heterocyclic nitrogen bases which contain in addition to the nitrogen atom a corresponding number of methylene groups, as well as optionally an additional nitrogen atom, an O or an S atom, said radical being bound, via a nitrogen atom; $R_1$ stands for hydrogen, an alkyl radical having from 1 to 4 carbon atoms, a pyridyl radical, a benzyl or phenyl radical, the two latter being optionally substituted by lower alkyl, lower alkoxy groups or halogen; $R_2$ represents hydrogen, nitro, amino, trifluoromethyl or lower alkoxy groups having from 1 to 4 carbon atoms; $R_3$ stands for alkoxy having from 1 to 4 carbon atoms; $m$ means one of the integers 1, 2 or 3 and $n$ means an integer from 1 to 4; and to the production of such derivatives by acylating, optionally in the presence of an acid-binding agent, 4(3H)-quinazolinones having the structural formula

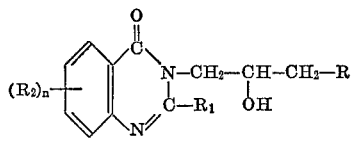

wheerin $R_1$, $R_2$ and $n$ have the above-given meanings, R is identical with R', or, in case R' contains an acyloxy radical of the structural formula

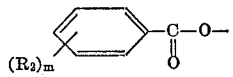

wherein $R_2$ and $m$ have the above-given meanings, said R may also represent the radical of the underlying hydroxy compound, with an alkoxy benzoic acid of the formula

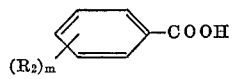

or a functional derivative thereof; or, the said derivatives may be produced by cyclizing, in the presence of dehydrating agents, 2-acylaminobenzamides having the structural formula

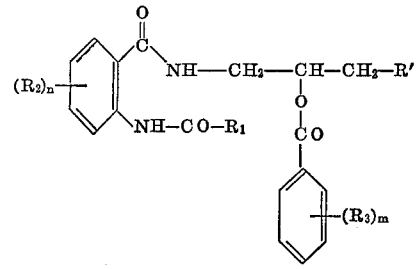

wherein the various radicals have the above-given meanings.

The present invention relates to new, pharmacologically valuable, basically substituted 4(3H)-quinazolinone derivatives of the general formula

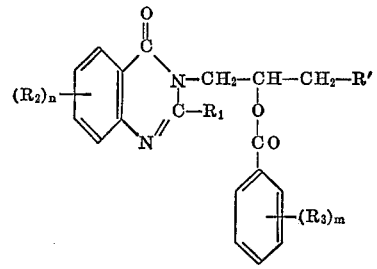

wherein R' stands for a radical selected from the group consisting of secondary aliphatic, cycloaliphatic or araliphatic amines having 2 to 10 carbon atoms and 5, 6 or 7-membered heterocyclic nitrogen bases which contain in addition to the nitrogen atom a corresponding number of methylene groups, as well as optionally an additional nitrogen atom, an O or an S atom, said radical being bound via a nitrogen atom; $R_1$ stands for hydrogen, an alkyl radical having from 1 to 4 carbon atoms, a pyridyl radical, a benzyl or phenyl radical, the two latter being optionally substituted by lower alkyl, lower alkoxy groups or halogen; $R_2$ represents hydrogen, nitro, amino, trifluoromethyl or lower alkoxy groups having from 1 to 4 carbon atoms; $R_3$ stands for alkoxy having from 1 to 4 carbon atoms; $m$ means one of the integers 1, 2 or 3 and $n$ means an integer from 1 to 4.

The radical of a secondary amine $R_1$ which is bound via a nitrogen atom may derive in the aliphatic series from mono and diamines, such as dialkylamines, alkylalkenylamines, alkylenediamines, hydroxyalkylamines, alkoxyalkylamines and alkylcyanoalkylamines, alkylalkoxycarbonylalkylamines and bis-(alkoxycarbonylalkyl)-amines.

Such amines are for instance: dimethylamine, diethylamines, allylmethylamine, N,N-diethyl-N'-methylethylenediamine, N,N - diethyl-N'-methylpropylenediamine, N-methylethanolamine, N-methylpropanolamine, N-isopropylethanolamine, N-butylethanolamine, N-benzylethanolamine, N-methylmethoxypropylamine, N-methylethoxypropylamine, N-methyl - β-cyanoethylamine, N-methyl-β-ethoxycarbonylethylamine, bis - β - ethoxycarbonylethylamine.

Cycloaliphatic amines may be for instances: N-methylcyclopropylamine, N-methyl-cyclohexylamine.

Amines of the araliphatic series may be for instance: phenalkylalkylamines such as benzylmethylamine, phenethylmethylamine.

Heterocyclic nitrogen bases may be for instance: 5, 6 and 7-membered heterocyclic nitrogen bases such as pyrrolidine, morpholine, thiomorpholine, piperidine, N- methylpiperazine, N-phenylpiperazine, N-(β-hydroxyethyl) - piperazine, N-(γ-hydroxypropyl)-piperazine, hexamethyleneimine.

Certain positions for the substitution by $R_2$ are preferred. In the case of a mono-substitution $R_2$ stands preferably in the 7-position, in the case of a di-substitution in the 6, 7 or 7, 8-position and in the case of a tri-substitution in the 5, 6, 7 or 6, 7, 8-position. The 4(3H)-quinazolinone derivatives of the present invention are obtained (a) by acylating, optionally in the presence of an acid-binding agent, 4(3H) - quinazolinones of the general formula

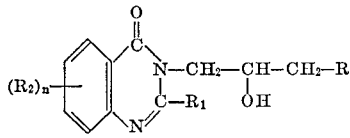

wherein $R_1$, $R_2$ and $n$ have the above-given meanings, R is identical with R', or, in case R' contains an acyloxy radical of the general formula

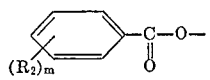

wherein $R_2$ and $m$ have the above-given meanings, said R may also represent the radical of the underlying hydroxy compound with an alkoxy benzoic acid of the general formula

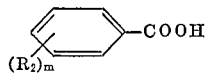

or a functional derivative thereof or (b) by cyclizing in the presence of dehydrating agents 2-acylaminobenzamides of the general formula

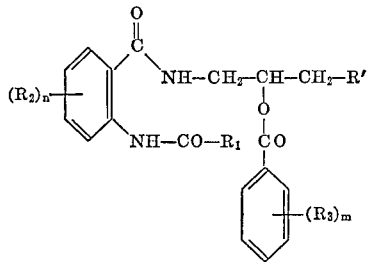

wherein R', $R_1$, $R_2$, $R_3$, $m$ and $n$ have the above-given meanings.

If, according to the process described under para (a), initial products are used wherein the radical of an amine R, which is bound via a nitrogen atom, contains a hydroxyalkyl group, and if 2 mols of alkoxy benzoic acid or of a functional derivative thereof are employed, one obtains the corresponding diesters. The 3-(γ)-amino-β-hydroxypropyl)-4(3H)-quinazolinones required as starting material for this process may be obtained by various routes of preparation according to the teachings of the corresponding application having the same title and the same filing date.

The initial products required for the method described under para (b) may be obtained in the usual manner according to analogous processes. Suitable dehydrating agents are in particular: phosphorus oxychloride, phosphorus pentachloride, thionylchloride, polyphosphoric acid and the like. Moreover, acid anhydrides and acid chlorides have proved particularly suited. If such acid derivatives are employed that derive from acids of the general formula $HOOC-R_1$ the acylation of the o-positioned amino group and the subsequent cyclization may be carried out in a single step.

The derivatives of the 4(3H)-quinazolinone according to the present invention are valuable pharmaceuticals. In particular, they are excellent coronary dilators and, in this respect, superior to other known substances of this kind.

With respect to the change in the oxygen tension in the coronary veinous blood, the pharmacological investigation of the vasodilator action on the coronary vessels was carried out in dogs according to the methods described by W. K. A. Schaper and his co-workers (see W. K. A. Schaper, R. Xhonneux, and J. M. Bogaard "Uber die kontinuierliche Messung des Sauerstoffdruckes in venösen Coronarblut" (Naunyln-Schmiedeberg's Arch. exp. Path. u. Pharmak. 245, 383–389 (1963)). The test preparations were applied intravenously to the narcotized and spontaneously breathing animals. On these test conditions the dilation of the coronary arteries caused by the test substances along with the increase in the coronary blood flow led to an increase in the oxygen tension in the coronary veinous blood. This oxygen tension was measured according to polarographic methods by means of a platin electrode of the Gleichmann-Lübbers type (see U. Gleichmann and D. W. Luebbers "Die Messung des Sauerstoffdruckes in Gasen und Flüssigkeiten mit der Platin-Elektrode unter besonderer Berücksichtigung der Messung im Blut," Pflügers Arch. 271, 431–455 (1960)). The heart rate was continuously measured by electronic methods from systolic peaks of the arterial blood pressure. The arterial blood pressure was measured in the known manner in the femoral artery with the aid of an electromanometer of the Statham-strain-gauge type.

The following table gives the results of the pharmacological investigations which were carried through. The preparations were tested in the form of their respective dihydrochlorides:

| Preparation | $LD_{50}$, g./kg. mouse (i.v.) | Dosage, mg./kg. (i.v.) | Maximal increase in oxygen tension in the coronary veinous blood | | Maximal change in the heart rate | |
|---|---|---|---|---|---|---|
| | | | Percent | Minutes | Percent | Minutes |
| 2-methyl-3-[γ-diethylamino-β-(3,4-5,trimethoxy-benzoxy)-propyl]-6,7,8-trimethoxy-4(3H)-quinazolinone | | 0.05 | +100 | >35 | −25 | 30 |
| 2-methyl-3-[γ-morpholino-β-(3,4,5-trimethoxy-benzoxy)-propyl]-6,7,8-trimethoxy-4(3H)-quinazolinone | 0.18 | 0.05 | +35 | 20 | +13 | >5 |
| 2-methyl-3-[γ-pyrrolidino-β-(3,4,5-trimethoxy-benzoxy)-propyl]-6,7,-8 trimethoxy-4(3H)-quinazolinone | 0.18 | 0.5 | +100 | ≈15 | +38 | ≈15 |
| 2-methyl-3-[γ-di-n-propylamino-β-(3,4,5-trimethoxy-benzoxy)-propyl]-6,7,8-trimethoxy-4(3H)-quinazolinone | 0.11 | 0.05 | +40 | >120 | 0 | 0 |
| 2-methyl-3-[γ-N-methyl-N-allylamino-β-(3,4,5-trimethoxy-benzoxy)-propyl]-6,7,8-trimethoxy-4(3H)-quinazolinone | 0.16 | 0.05 | +13 | ≈3 | +9 | 3 |
| 2-methyl-3-[γ-N-methyl-N-ethylamino-β-(3,4,5-trimethoxy-benzoxy-)propyl]-6,7,8-trimethoxy-4(3H)-quinazolinone | 0.17 | 0.05 | +18 | 5 | 0 | 0 |
| 2-methyl-3-[γ-piperidino-β-(3,4,5-trimethoxy-benzoxy)-propyl]-6,7,8-trimethoxy-4(3H)-quinazolinone | 0.11 | 0.05 | +48 | ≈20 | 0 | 0 |
| 2-methyl-3-[γ-hexamethylene-imino-β-(3,4,5-trimethoxy-benzoxy)-propyl]-6,7,8-trimethoxy-4(3H)-quinazolinone | 0.13 | 0.05 | +18 | ≈10 | +19 | 10 |
| 2-methyl-3-[γ-(4-{β-(3,4,5-trimethoxy-benzoxy)-ethyl}- piperazino(1))-β-(3,4,5-trimethoxy-benzoxy)-propyl]-6,7,8-trimethoxy-4(3H)-quinazolinone | | 0.05 | +165 | >35 | +6 | >35 |
| 2-methyl-3-[γ-4-methyl-piperazino(1)-β-(3,4,5-trimethoxy-benzoxy)-propyl]-6,7,8-trimethoxy-4(3H)-quinazolinone | | 0.1 | +20 | 15 | 0 | 0 |
| 2-ethyl-3-[γ-morpholino-β-(3,4,5-trimethoxy-benzoxy)-propyl]-6,7,8-trimethoxy-4(3H)-quinazolinone | | 0.05 | +75 | ≈40 | 0 | 0 |
| 2 - ethyl - 3 - [γ - diethylamino - β - (3,4,5 - trimethoxy - benzoxy) - propyl] - 6,7,8 - trimethoxy-4(3H)-quinazolinone | | 0.05 | +72 | ≈40 | | |

TABLE—Continued

| Preparation | LD 50, g./kg. mouse (i.v.) | Dosage, mg./kg. (i.v.) | Maximal increase in oxygen tension in the coronary venous blood | | Maximal change in the heart rate | |
|---|---|---|---|---|---|---|
| | | | Percent | Minutes | Percent | Minutes |
| 2 - ethyl - 3 - [γ - piperidino - β - (3,4,5 - trimethoxy - benzoxy) - propyl]- 6,7,8 - trimethoxy-4(3H)-quinazolinone | 0.085 | 0.05 | +69 | ≈45 | +19 | ≈15 |
| 2 - ethyl - 3 - [γ - pyrrolidino - β - (3,4,5 - trimethoxy - benzoxy) - propyl] - 6,7,8 - trimethoxy-4(3H)-quinazolinone | 0.1 | 0.05 | +89 | >15 | +10 | 10 |
| 2 - ethyl - 3 - [γ - N - methyl - N - β - methoxypropyl- amino - β - (3,4,5 - trimethoxy-benzoxy)-propyl]-6,7,8-trimethoxy-4(3H)-quinazolinone | | 0.05 | +91 | >25 | +50 | ≈10 |
| 2 - ethyl - 3 - [γ - N - methyl - N - allyl - amino - β - (3,4,5 - trimethoxy - benzoxy)-propyl]-6,7,8-trimethoxy-4(3H)-quinazolinone | 0.1 | 0.05 | +150 | >45 | 0 | 0 |
| 2 - ethyl - 3 - [γ - N - methyl - N - cyclohexyl - amino - β - (3,4,5 - trimethoxy-benzoxy)-propyl]-6,7,8-trimethoxy-4(3H)-quinazolinone | 0.1 | 0.05 | +67 | >10 | 0 | 0 |
| 2 - methyl - 3 - [γ - N - methyl - N - β - ethoxycarbonylethyl - amino - β - (3,4,5 - trimethoxy-benzoxy)-propyl]-6,7,8-trimethoxy-4(3H)-quinazolinone | 0.1 | 0.05 | +21 | ≈30 | −12 | 20 |
| 2 - methyl - 3 - [γ - N,N - di - (β - ethoxycarbonylethyl) - amino - β - (3,4,5-trimethoxy-benzoxy)-propyl]-6,7,8-trimethoxy-4(3H)-quinazolinone | 0.1 | 0.05 | +21 | >20 | 0 | 0 |
| 2 - methyl - 3 - [γ - N - methyl - N - β - cyanoethyl - amino - β - (3,4,5 - trimethoxy-benzoxy)-propyl]-6,7,8-trimethoxy-4(3H)-quinazolinone | 0.1 | 0.05 | +20 | ≈30 | 0 | 0 |
| 2-(3,4,5-trimethoxyphenyl)-3-[γ-diethylamino-β-(3,4,5-trimethoxy-benzoxy)-propyl]-6,7,8-trimethoxy-4(3H)-quinazolinone | 0.082 | 0.05 | +16 | ≈10 | 0 | 0 |
| 2-phenyl-3-[γ-diethylamino-β-(3,4,5-trimethoxy-benzoxy)-propyl]-6,7,8-trimethoxy-4(3H)-quinazolinone | 0.24 | 0.05 | +30 | 20 | +8 | 25 |
| 2-m-pyridyl-3-[γ-diethylamino-β-(3,4,5-trimethoxy-benzoxy)-propyl]-6,7,8-trimethoxy-4(3H)-quinazolinone | 0.063 | 0.05 | +33 | ≈40 | +19 | 5 |
| 2-p-tolyl-3-[γ-diethylamino-β-(3,4,5-trimethoxy-benzoxy)-propyl]-6,7,8-trimethoxy-4(3H)-quinazolinone | 0.15 | 0.05 | +13 | ≈15 | +19 | 20 |
| 2-p-chlorophenyl-3-[γ-diethylamino-β-(3,4,5-trimethoxy-benzoxy)-propyl]-6,7,8-trimethoxy-4(3H)-quinazolinone | >0.25 | 0.05 | +10 | ≈10 | +13 | 20 |
| 2-methyl-3-[γ-diethylamino-β-(3,4,5-trimethoxy-benzoxy)-propyl]-6,7-dimethoxy-4(3H)-quinazolinone | 0.15 | 1.0 | +51 | 35 | +52 | 10 |
| 2-methyl-3-[γ-diethylamino-β-(3,4,5-trimethoxy-benzoxy)-propyl]-5,6,7,8-tetramethoxy-4(3H)-quinazolinone | | 0.05 | +37 | 10 | +29 | >15 |
| 2-n-propyl-3-[γ-piperidino-β-(3,4,5-trimethoxy-benzoxy)-propyl]-6,7,8-trimethoxy-4(3H)-quinazolinone | | 0.05 | +91 | 40 | +11 | ≈45 |
| 2-n-propyl-3-[γ-morpholino-β-(3,4,5-trimethoxy-benzoxy)-propyl]-6,7,8-trimethoxy-4(3H)-quinazolinone | 0.17 | 0.05 | +100 | 45 | 0 | 0 |
| 2-methyl-3-[γ-diethylamino-β-(3,4,5-trimethoxy-benzoxy)-propyl]-5,6,7-trimethoxy-4(3H)-quinazolinone | 0.13 | 0.05 | +18 | 30 | +31 | 30 |
| 2-ethyl-3-[γ-morpholino-β-(3,4,5-triethoxy-benzoxy)-propyl]-6,7,8-trimethoxy-4(3H)-quinazolinone | 0.11 | 0.05 | +79 | ≈45 | +19 | ≈10 |
| 2-ethyl-3-[γ-diethylamino-β-(3,5-dimethoxy-4-n-butoxy-benzoxy)-propyl]-6,7,8-trimethoxy-4(3H)-quinazolinone | 0.063 | 0.05 | +67 | ≈55 | 0 | 0 |

In the preparation of dragées and tablets containing as essential active ingredient the quinazolinone derivatives of our invention these substances may be admixed with the conventional solid tabletting adjuvants, such as starch, lactose, talc and the like. Any of the tabletting materials and carriers customary in pharmaceutical practice may be employed.

For the preparation of the injection solutions the hydrochlorides of the quinazolinone derivatives are particularly suited since they have mostly a good water-solubility. Injection solutions of water-insoluble products may of course be prepared in the conventional manner by concurrently using well known suspending agents, emulsifiers and/or solubilizers.

For a better understanding of the nature and the objects of this invention, reference should be made to the accompanying examples which are of an illustrative rather than a limiting nature. Unless otherwise stated, all temperatures given are in degrees centigrade.

EXAMPLE 1

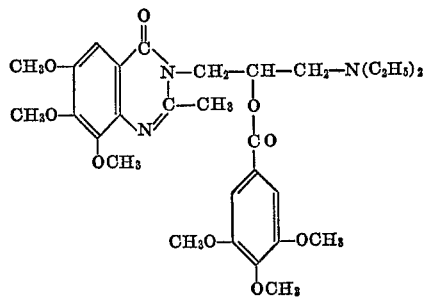

37.9 g. (0.1 mol) 2-methyl-3-(γ-diethylamino-β-hydroxy-propyl)-6,7,8-trimethoxy-4(3H)-quinazolinone are dissolved in 300 cc. anhydrous benzene and admixed with 11.1 g. (0.11 mol) triethylamine. Subsequently, a solution consisting of 25.3 g. (0.11 mol) 3,4,5-trimethoxybenzoyl chloride in 80 cc. anhydrous benzene is added dropwise while stirring at room temperature and stirring is continued for another hour at room temperature. The reaction mixture is heated to the boil and stirred under reflux during 10 hours. After cooling down the separated triethylamine hydrochloride is sucked off and the filtrate is evaporated to dryness in vacuo. The residue is dissolved in dilute hydrochloric acid and the insolute is filtered off. Subsequently, the hydrochloric acid filtrate is rendered alkaline by the addition of solid potassium carbonate and the oily separating reaction product is dissolved in ethyl acetate. After drying over anhydrous potassium carbonate, one obtains by the introduction of anhydrous gaseous hydrogen chloride into the ethyl acetate solution the hydrochloride of the 2-methyl-3-[γ-diethylamino-β-(3,4,5-trimethoxybenzoxy) - propyl] - 6,7,8 - trimethoxy-4(3H)-quinazolinone in the form of colorless needles melting at 148°.

Yield: 47 g. (=78.7% of the theoretical).

EXAMPLE 2

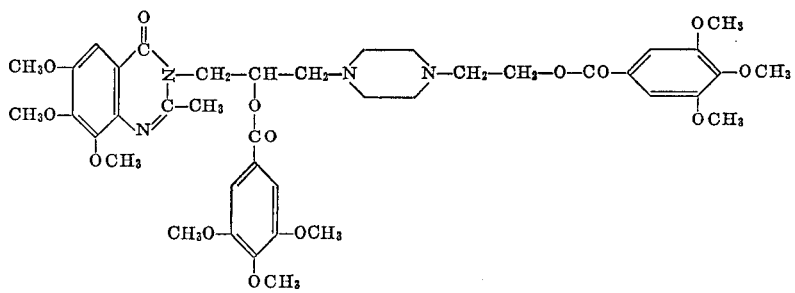

54.5 g. (0.1 mol) 2-methyl-3-[γ-(4'-β-hydroxyethylpiperazino/1'/) - β - hydroxypropyl/-6,7,8-trimethoxy-4(3H)-quinazolinone-trihydrochloride are suspended in 400 cc. anhydrous benzene with the addition of 55.5 g. (0.55 mol) triethylamine. Subsequently, a solution consisting of 46 g. (0.2 mol) 3,4,5-trimethoxybenzoyl chloride in 120 cc. anhydrous benzene is added dropwise while stirring at room temperature. Stirring is continued for one hour and subsequently for 8 hours under reflux. The separated triethylamine hydrochloride is sucked off and the filtrate is concentrated in vacuo. The residue is dissolved in dilute hydrochloric acid, filtered off and the filtrate is rendered alkaline by the addition of solid potassium carbonate. The oily separating reaction product is disolved in ethyl acetate. The solution is dried over potassium carbonate and one obtains by the introduction of gaseous hydrogen chloride the trihydrochloride of the 2-methyl-3-[γ-(4'-β-3,4,5-trimethoxybenzoxyethylpiperazino[1'] - β - (3,4,5-trimethoxybenzoxy) - propyl]-6,7,8-trimethoxy-4(3H)-quinazolinone in the form of colorless needles melting at 204°.
Yield: 59 g. (=63.2% of the theoretical).

Analogously to the descriptions given in Examples 1 and 2 the following compounds of the present invention may be prepared:

General formula:

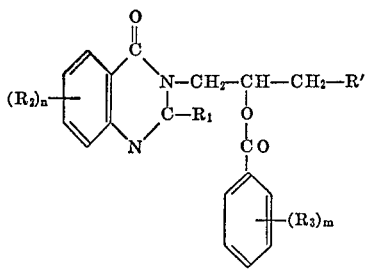

| $(R_2)_n$ | $(R_3)_m$ | $R_1$ | $R'$ | M.P., deg. (dihydrochloride) |
|---|---|---|---|---|
| H | 3,4,5-(OCH₃)₃ | CH₃ | N(C₂H₅)₂ | 166-170 |
| 7-NO₂ | 3,4,5-(OCH₃)₃ | CH₃ | N(C₂H₅)₂ | 209-212 |
| 7-NH₂ | 3,4,5-(OCH₃)₃ | CH₃ | N(C₂H₅)₂ | ¹260 |
| 7-Cl | 3,4,5-(OCH₃)₃ | CH₃ | N(C₂H₅)₂ | 160 |
| 7-CF₃ | 3,4,5-(OCH₃)₃ | CH₃ | N(C₂H₅)₂ | 158 |
| 6,8-Cl₂ | 3,4,5-(OCH₃)₃ | CH₃ | N(C₂H₅)₂ | 138-140 |
| 6,7-(OCH₃)₂ | 3,4,5-(OCH₃)₃ | CH₃ | N(C₂H₅)₂ | 134 |
| 5,6,7-(OCH₃)₃ | 3,4,5-(OCH₃)₃ | CH₃ | N(C₂H₅)₂ | 120 |
| 5,6,7-(OCH₃)₃ | 3,4,5-(OCH₃)₃ | CH₃ | morpholino | 135 |
| 6,7,8-(OCH₃)₃ | 3,4,5-(OCH₃)₃ | H | morpholino | 108 |
| 6,7,8-(OCH₃)₃ | 3,4,5-(OCH₃)₃ | H | piperidino | 110 |
| 6,7,8-(OCH₃)₃ | 3,4,5-(OCH₃)₃ | CH₃ | N(n-C₃H₇)₂ | 170 |
| 6,7,8-(OCH₃)₃ | 3,4,5-(OCH₃)₃ | CH₃ | N(CH₃)C₂H₅ | 115 |
| 6,7,8-(OCH₃)₃ | 3,4,5-(OCH₃)₃ | CH₃ | N(CH₃)C₄H₉ | 100 |
| 6,7,8-(OCH₃)₃ | 3,4,5-(OCH₃)₃ | CH₃ | N(CH₃)CH₂—CH=CH₂ | 129 |
| 6,7,8-(OCH₃)₃ | 3,4,5-(OCH₃)₃ | CH₃ | N(CH₃)CH₂CH₂N(C₂H₅)₂ | ¹135 |
| 6,7,8-(OCH₃)₃ | 3,4,5-(OCH₃)₃ | CH₃ | N(CH₃)CH₂CH₂CH₂OC₂H₅ | 105 |
| 6,7,8-(OCH₃)₃ | 3,4,5-(OCH₃)₃ | CH₃ | N(CH₃)-cyclopropyl | 95 |
| 6,7,8-(OCH₃)₃ | 3,4,5-(OCH₃)₃ | CH₃ | N(CH₃)-cyclohexyl | 122 |
| 6,7,8-(OCH₃)₃ | 3,4,5-(OCH₃)₃ | CH₃ | N(CH₃)CH₂C₆H₅ | 112 |
| 6,7,8-(OCH₃)₃ | 3,5,5-(OCH₃)₃ | CH₃ | piperidino | 180 |
| 6,7,8-(OCH₃)₃ | 3,4,5-(OCH₃)₃ | CH₃ | morpholino | 259 |

TABLE—Continued

| $(R_2)_n$ | $(R_3)_m$ | $R_1$ | R' | M.P., deg. (dihydrochloride) |
|---|---|---|---|---|
| 6,7,8-(OCH$_3$)$_3$ | 3,4,5-(OCH$_3$)$_3$ | CH$_3$ | piperidino | 142 |
| 6,7,8-(OCH$_3$)$_3$ | 3,4,5-(OCH$_3$)$_3$ | CH$_3$ | hexamethyleneimino | 109 |
| 6,7,8-(OCH$_3$)$_3$ | 3,4,5-(OCH$_3$)$_3$ | CH$_3$ | 4-methylpiperazino | 191 |
| 6,7,8-(OCH$_3$)$_3$ | 3,4,5-(OCH$_3$)$_3$ | CH$_3$ | thiomorpholino | 153 |
| 6,7,8-(OCH$_3$)$_3$ | 3,4,5-(OCH$_3$)$_3$ | CH$_3$ | N-[CH$_2$CH$_2$-O-CO-(3,4,5-trimethoxyphenyl)]piperazino | 204 |
| 6,7,8-(OCH$_3$)$_3$ | 3,4,5-(OCH$_3$)$_3$ | C$_2$H$_5$ | N(C$_2$H$_5$)$_2$ | 75 |
| 6,7,8-(OCH$_3$)$_3$ | 3,4,5-(OCH$_3$)$_3$ | C$_2$H$_5$ | N(CH$_3$)—CH$_2$CH$_2$CH$_2$—O—CH$_3$ | 167 |
| 6,7,8-(OCH$_3$)$_3$ | 3,4,5-(OCH$_3$)$_3$ | C$_2$H$_5$ | N(CH$_3$)—CH$_2$—CH=CH$_2$ | 169 |
| 6,7,8-(OCH$_3$)$_3$ | 3,4,5-(OCH$_3$)$_3$ | C$_2$H$_5$ | N(CH$_3$)—cyclohexyl | 177 |
| 6,7,8-(OCH$_3$)$_3$ | 3,4,5-(OCH$_3$)$_3$ | C$_2$H$_5$ | morpholino | 125 |
| 6,7,8-(OCH$_3$)$_3$ | 3,4,5-(OCH$_3$)$_3$ | C$_2$H$_5$ | pyrrolidino | 100 |
| 6,7,8-(OCH$_3$)$_3$ | 3,4,5-(OCH$_3$)$_3$ | C$_2$H$_5$ | piperidino | 100 |
| 6,7,8-(OCH$_3$)$_3$ | 3,4,5-(OCH$_3$)$_3$ | n-C$_3$H$_7$ | piperidino | 124 |
| 6,7,8-(OCH$_3$)$_3$ | 3,4,5-(OCH$_3$)$_3$ | n-C$_3$H$_7$ | morpholino | 90 |
| 6,7,8-(OCH$_3$)$_3$ | 3,4,5-(OCH$_3$)$_3$ | C$_6$H$_5$ | N(C$_2$H$_5$)$_2$ | 70 |
| 6,7,8-(OCH$_3$)$_3$ | 3,4,5-(OCH$_3$)$_3$ | C$_6$H$_4$(4-Cl) | N(C$_2$H$_5$)$_2$ | 178-179 |
| 6,7,8-(OCH$_3$)$_3$ | 3,4,5-(OCH$_3$)$_3$ | C$_6$H$_2$(3,4,5-(OCH$_3$)$_3$) | N(C$_2$H$_5$)$_2$ | 80 |
| 6,7,8-(OCH$_3$)$_3$ | 3,4,5-(OCH$_3$)$_3$ | C$_6$H$_4$(4-CH$_3$) | N(C$_2$H$_5$)$_2$ | 107 |
| 6,7,8-(OCH$_3$)$_3$ | 3,4,5-(OCH$_3$)$_3$ | —CH$_2$—C$_6$H$_2$(2,3,4-(OCH$_3$)$_3$) | morpholino | 105-110 |
| 6,7,8-(OCH$_3$)$_3$ | 3,4,5-(OCH$_3$)$_3$ | CH$_3$ | N(CH$_3$)CH$_2$CH$_2$—O—CO-(3,4,5-trimethoxyphenyl) | 150 |
| 6,7,8-(OCH$_3$)$_3$ | 3,4,5-(OCH$_3$)$_3$ | pyridyl | N(C$_2$H$_5$)$_2$ | 86-92 |
| 6,7,8-(OCH$_3$)$_3$ | 3,4,5-(OCH$_3$)$_3$ | CH$_3$ | N(CH$_3$)CH$_2$CH$_2$CN | [2] 100 |
| 6,7,8-(OCH$_3$)$_3$ | 3,4,5-(OCH$_3$)$_3$ | CH$_3$ | N(CH$_3$)CH$_2$CH$_2$COOC$_2$H$_5$ | [2] 70 |
| 6,7,8-(OCH$_3$)$_3$ | 3,4,5-(OCH$_3$)$_3$ | CH$_3$ | N(CH$_2$CH$_2$COOC$_2$H$_5$)$_2$ | [2] 86 |
| 6,7,8-(OCH$_3$)$_3$ | 3,4,5-(OC$_2$H$_5$)$_3$ | C$_2$H$_5$ | morpholino | 115 |
| 6,7,8-(OCH$_3$)$_3$ | 3,5-(OCH$_3$)$_2$—4(OC$_4$H$_9$) | C$_2$H$_5$ | N(C$_2$H$_5$)$_2$ | 98 |
| 5,6,7,8-(OCH$_3$)$_4$ | 3,4,5-(OCH$_3$)$_3$ | CH$_3$ | N(C$_2$H$_5$)$_2$ | [2] 110 |

[1] Trihydrochloride. [2] Decomp.

EXAMPLE 3

2-nitro-3,4,5-trimethoxy-N-(γ-diethylamino-β-hydroxypropyl)-benzamide 82.6 g. (0.3 mol) 2-nitro-3,4,5-trimethoxybenzoyl chloride are dissolved in 200 cc. anhydrous benzene and added dropwise, while stirring, to a solution consisting of 43.8 g. (0.3 mol) γ-diethylamino-β-hydroxypropylamine and 30.3 g. (0.3 mol) triethylamine in 500 cc. anhydrous benzene. Stirring is continued for 3 hours under reflux and after cooling down, the filtrate is evaporated to dryness in vacuo. For further purification purposes the crude product is dissolved in dilute hydrochloric acid and, after filtration, the filtrate is rendered alkaline by the addition of an aqueous potassium carbonate solution. The base which hereby separates in the form of an oil, is dissolved in ethyl acetate and washed several times with water. After drying over potassium carbonate the ethyl acetate solution is concentrated in vacuo and thus obtained is the 2-nitro-3,4,5-trimethoxy - N - (γ-diethylamino-β-hydroxypropyl)-benzamide in the form of a yellowish oil.

Yield: 91 g. (=79% of the theoretical).

2-nitro-3,4,5-trimethoxy-N-[γ-diethylamino-β-(3,4,5-trimethoxybenzoxy)-propyl]-benzamide 38.5 g. (0.1 mol) 2-nitro-3,4,5-trimethoxy-N-(γ-diethylamino-β-hydroxypropyl)-benzamide and 15.15 g. (0.15 mol) triethylamine are dissolved in 200 cc. anhydrous benzene and admixed with stirring with a solution consisting of 34.5 g. (0.15 mol) 3,4,5-trimethoxybenzoyl chloride in 150 cc. anhydrous benzene. Subsequently, the reaction mixture is heated to the boil and stirring is continued for 6 hours under reflux. After cooling down the reaction product is stirred out with 300 cc. water and the benzene layer is separated. Subsequently, the benzene layer is shaken out with dilute hydrochloric acid. The aqueous hydrochloric acid solution is rendered alkaline by the addition of aqueous potassium carbonate solution and the base which separates in the form of an oil is dissolved in ethyl acetate. The thusly obtained ethyl acetate solution is washed with water and evaporated to dryness, after drying over potassium carbonate, in vacuo. For further purification the crude product is recrystallized from alcohol. Thus obtained is the 2-nitro-3,4,5-trimethoxy-N-[γ-diethylamino - β - (3,4,5-trimethoxybenzoxy)-propyl]-benzamide in the form of light yellow crystals melting at 107°.

Yield: 46 g. (=79.5% of the theoretical)

2-amino-3,4,5-trimethoxy-N-[γ-diethylamino-β-(3,4,5-trimethoxybenzoxy)-propyl]-benzamide 58 g. (0.1 mol) 2-nitro-3,4,5-trimethoxy-N-[γ-diethylamino - β - (3,4,5-trimethoxybenzoxy)-propyl]-benzamide are dissolved in 250 cc. methanol and hydrogenated at 30–40° in the presence of Raney nickel at a hydrogen pressure of 70 atmosphere. The reaction product is sucked off from the catalyst and the filtrate is evaporated to dryness in vacuo. The oily residue is dissolved in ethyl acetate and by the addition of etheric hydrochloric acid the dihydrochloride of the 2-amino-3,4,5-trimethoxy-N-[γ-diethylamino - β - (3,4,5-trimethoxybenzoxy)-propyl]-benzamide is precipitated in the form of colorless needles having a decomposition point of 75°.

Yield: 49 g. (=78.7% of the theoretical).

2-methyl3-[γ-diethylamino-β-(3,4,5-trimethoxybenzoxy)-propyl]-6,7,8-trimethoxy-4(3H)-quinazolinone 54.9 g. (0.1 mol) 2-amino-3,4,5-trimethoxy-N-[γ-diethylamino - β - (3,4,5-trimethoxybenzoxy)-propyl]-benzamide are dissolved in 250° cc. acetic anhydride and stirred during 16 hours under reflux. After cooling down the reaction mixture is concentrated in vacuo. The residue is stirred together with aqueous sodium carbonate solution and the oily separating base is dissolved in ethyl acetate. After drying over potassium carbonate one obtains by the introduction of gaseous hydrogen chloride into the ethyl acetate solution the hydrochloride of the 2-methyl-3-[γ-diethylamino-β-(3,4,5 - trimethoxybenzoxy)-propyl]-6,7,8-trimethoxy-4(3H)-quinazolinone in the form of colorless needles melting at 148°.

Yield: 26 g. (=43.5% of the theoretical).

The above compound is also obtained with a good yield by acylating first the 2-amino-3,4,5-trimethoxy-N-[γ-diethylamino - β - (3,4,5-trimethoxybenzoxy)-propyl]-benzamide with acetylchloride so as to form the corresponding acetylamino compound and by subsequently cyclizing the reaction product in the usual manner with acetic anhydride, phosphorus oxychloride, thionylchloride, phosphorus pentachloride or polyphosphoric acid.

What is claimed is:

1. Basically substituted 4(3H)-quinazolinone derivatives having the structural formula

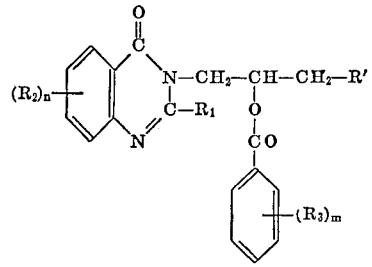

wherein R' stands for a radical selected from the group consisting of dialkylamino the alkyl radical thereof having 1–4 carbon atoms; N-methyl-N-cycloalkylamino, the cycloalkyl radical having 3–6 carbon atoms; N-methylphenalkylamino, alkyl having 1–2 carbon atoms; N-methylallylamino and diethylamino-alkylene-amino, alkylene having 2–3 carbon atoms; pyrrolidino, piperidino, morpholino, thiomorpholino and piperazino; $R_1$ stands for a radical selected from the group consisting of hydrogen, an alkyl radical having 1–4, inclusive, carbon atoms, a pyridyl radical, benzyl and phenyl radicals; said benzyl and phenyl radicals being optionally substituted by alkyl and alkoxy groups having 1–4 carbon atoms or halogen; $R_2$ stands for a radical selected from the group consisting of hydrogen, nitro, amino trifluoromethyl radicals and alkoxy radicals having 1–4, inclusive, carbon atoms; $R_3$ stands for an alkoxy radical having 1–4, inclusive, carbon atoms; $m$ stands for an integer selected from 1–3 inclusive; and $n$ stands for an integer selected from 1–4, inclusive.

2. Basically substituted 4(3H)-quinazoline derivatives according to claim 1, wherein R' is selected from the group consisting of —N($C_2H_5$)$_2$, —N(n—$C_3H_7$)$_2$, —N($CH_3$)$C_2H_5$, —N($CH_3$)$C_4H_9$,

—N($CH_3$)$CH_2$—CH=$CH_2$,

—N($CH_3$)$CH_2$N($CH_5$)$_2$, —N($CH_3$)$CH_2CH_2CH_2OC_2H_5$,

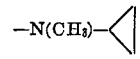, —N($CH_3$)$CH_2C_6H_5$, —N($CH_3$)$CH_2CH_2CN$,

—N($CH_3$)$CH_2CH_2COOC_2H_5$, —N($CH_2CH_2COOC_2H_5$)$_2$,

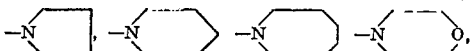

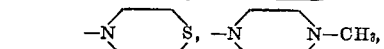

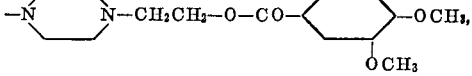

and

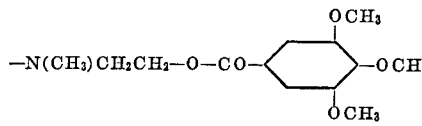

3. Basically substituted 4(3H)-quinazoline derivatives according to claim 1, wherein ($R_2$)$_n$ is selected from the group consisting of H, 7-$NO_2$, 7-NH, 7-Cl, 7-$CF_3$, 6,8-$Cl_2$, 6,7-($OCH_3$)$_2$, 5,6,7-($OCH_3$)$_3$, 6,7,8-($OCH_3$)$_3$ and 5,6,7,8-($OCH_3$)$_4$.

4. Basically substituted 4(3H)-quinazolinone derivatives according to claim 1, wherein ($R_3$)$_m$ is selected from the group consisting of 3,4,5-($OCH_3$)$_3$, 3,4,5-($OC_2H_5$)$_3$ and 3,5-($OCH_3$)$_2$-4($CO_4H_9$).

5. Basically substituted 4(3H)-quinazolinone derivatives according to claim 1, wherein $R_1$ is selected from the group consisting of —H, —CH$_3$, —C$_2$H$_5$, n-C$_3$H$_7$, —C$_6$H$_5$, —C$_6$H$_4$(4-Cl) —C$_6$H$_4$(4-Cl), —C$_6$H$_4$(3,4,5-(OCH$_3$)$_3$,
—C[H$_4$(4-CH$_3$), —CH$_2$—C$_6$H$_2$(2,3,4-(OCH$_3$)$_3$), and
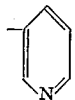
References Cited
Elderfield (ed.), Heterocyclic Compounds, vol. 6, N.Y., John Wiley & Sons, 1957, pp. 331–9.
RICHARD J. GALLAGHER, Primary Examiner
U.S. Cl. X.R.
260—247.2 A, 256.4 Q, 473 R, 477, 559 R; 424—246, 248, 251

UNITED STATES PATENT OFFICE
CERTIFICATE OF CORRECTION

Patent No. 3,738,985     Dated June 12, 1973

Inventor(s) Rudi Beyerle et al.

It is certified that error appears in the above-identified patent and that said Letters Patent are hereby corrected as shown below:

In the heading to the printed specification, after line 9, insert -- assignors to Cassella Farbwerke Mainkur Aktiengesellschaft, Frankfurt, Germany, a company of Germany --.

Signed and sealed this 27th day of August 1974.

(SEAL)
Attest:

McCOY M. GIBSON, JR.
Attesting Officer

C. MARSHALL DANN
Commissioner of Patents